July 10, 1956

M. MANUEL 2,753,949

BENZOL SPRAY SCRUBBER

Filed July 6, 1953

INVENTOR
MAYLAM MANUEL
BY John E. Hubbell
ATTORNEY

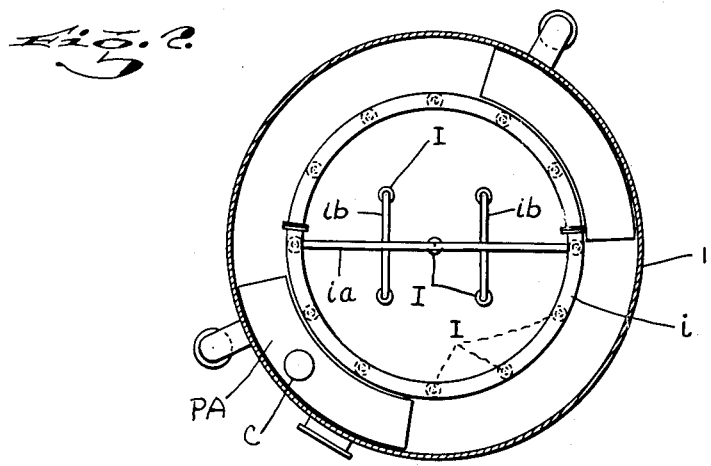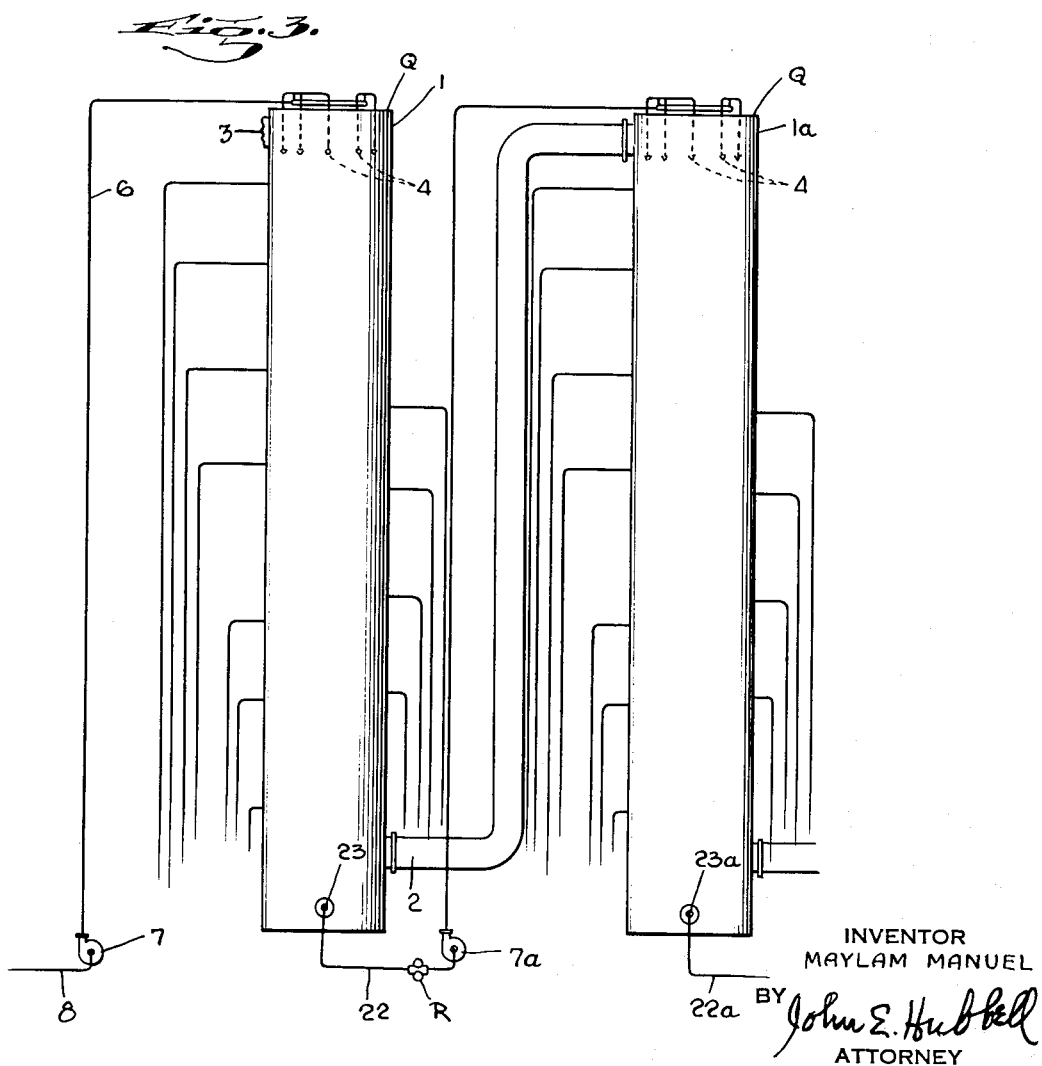

July 10, 1956

M. MANUEL 2,753,949

BENZOL SPRAY SCRUBBER

Filed July 6, 1953

INVENTOR
MAYLAM MANUEL

BY John E. Hubbell
ATTORNEY

United States Patent Office 2,753,949
Patented July 10, 1956

2,753,949

BENZOL SPRAY SCRUBBER

Maylam Manuel, Hamburg, N. Y., assignor to Otto Construction Corporation, New York, N. Y., a corporation of New York Application July 6, 1953, Serial No. 366,145

12 Claims. (Cl. 183—2)

The general object of the present invention is to provide an improved method of, and improved apparatus for scrubbing benzol out of coke oven gas and for analogous scrubbing actions. It has long been substantially universal practice in by-product coke oven plants in this country to separate benzol vapors from coke oven gas by scrubbing the gas in packed towers. Each such tower is filled with a pervious mass of liquid and gas distributing material, except for a relatively short liquid distributing space adjacent the upper end of the tower into which the scrubbing liquid is usually sprayed and from which the gas is withdrawn. The word "benzol" is used generically herein to apply to substances known as "light oils" including benzene, toluene, xylenes and solvent naphtha in their liquid and gaseous phases.

Formerly the mass of pervious distributing material usually consisted of a multiplicity of wooden grids stacked or piled in the tower. In recent years, expanded metal, and sometimes metal shavings or turnings, have been largely used as the grid materials stacked or piled up in benzol scrubbing towers. The scrubbing fluid commonly used in this countery for removing and absorbing benzol and other light oil vapors from coke oven gas is the petroleum product known as "straw oil." Other scrubbing oils may be used and in Europe the scrubbing agent usually employed to recover benzol vapors is the oil known as "creosote" oil.

The separation of benzol vapors from coke oven gas presents special problems because of the large volume of gas to be scrubbed in a modern by-product coke oven plant of customary capacity. Such a plant may include several grid filled benzol scrubbing towers, each customarily having a height of from ninety to one hundred ten feet and a diameter of from thirteen to eighteen feet, though occasionally such a tower may be shorter and smaller in diameter. Customarily, the maximum rate at which gas is passed through packed towers has been about 1½ cubic feet per second, per square foot of tower cross section. In some plants, the coke oven gas is passed successively upward through two such towers while wash oil is passed in the opposite direction through said towers so that part of the benzol content of the gas stream may be eliminated in each tower.

In the use of a grid filled benzol scrubbing tower, the presence of the grids reduces the free gas flow area through the tower about 50%, under the most favorable conditions of operation. Those conditions prevail only when the grids are clean. In normal operation, however, the free flow area through the grid stack passages is continuously being reduced as the result of the formation in the scrubbing liquor of clogging material which deposits on the grid and tower surfaces. The clogging material consists of or comprises a gummy substance including sulphur, which adheres to the grid and tank walls with which it comes in contact. A grid filled tower in a clean condition, operates with reasonable efficiency from the benzol recovery standpoint, when proper allowance is ishes in operation, however, as a result of deposits of made for the reduction in the average cross section of the free flow path by the grids.

The efficiency of a clean packed tower rapidly diminclogging material on the grids and tower wall. One result of the clogging action is a rapid increase in the gas pressure drop in passing through the tower. In regular operation, the gas pressure may increase from a minimum of two or three inches of water when the tower is clean, to a water head of 20″ at the end of an operating period of three months or so, if not cleaned during that period. Such a large pressure drop is highly objectionable, and in the regular operation of most packed tower benzol scrubbers, cleaning operations are effected at intervals frequent enough to prevent a pressure drop in the tower as great as a water head of 20″. The operation of cleaning a benzol scrubber tower is difficult and dangerous, as the gummy substance which accumulates on the grids and tower walls contains compounds including sulphur which are washed out of the coke oven gas and which ignite on contact with the atmosphere. When ignition in a benzol scrubbing tower being cleaned is started it may continue until the tower is destroyed.

The present invention is an improvement on benzol scrubbing method and apparatus disclosed and claimed in the patent application of Carl Otto, Serial No. 34,515, filed June 22, 1948, now Patent 2,675,215 dated April 13, 1954. In the use of that invention, benzol is scrubbed out of coke oven gas in a tower which is not packed and which has a substantially unobstructed gas flow path upward through the tower, and which includes provisions for spraying scrubbing oil in finely divided form into and dispersing it in the tower. The benzol scrubbing towers disclosed in said Otto application are divided into three or four superposed spray sections with provisions for collecting spray liquor at the lower end of each section, and include recirculating provisions for respraying some of the liquor so collected at the bottoms of the sections back into the tower at different levels. A number of benzol scrubbers of the type and form disclosed in said Otto application are now in successful use, and have about double the capacity of the packed towers per unit of tower volume, and do not present the cleaning problems inherent in the operation of packed tower benzol scrubbers.

The present invention comprises specific improvements on the benzol spray scrubber invention disclosed and claimed in said Otto application, Serial No. 34,515, Patent 2,675,215. Primary objects of the present invention are to increase the efficiency with which the available liquid head is utilized in spraying liquid into portions of vertically elongated tower sections at different levels, and to improve the distribution of the spray liquid in the lower portions of said sections. The present invention is characterized in particular, by its provisions for discharging scrubbing oil into the lower portion of a vertically elongated scrubbing section in upwardly directed conical jets, so arranged and disposed that the liquid particles sprayed upward from relatively low level spray points will collide with liquid particles sprayed downwardly from higher level spray points of the section. Advantageously, the liquid particles sprayed upward from a relatively low level are of smaller average size than the liquid particles discharged downwardly from spray points at a relatively high level.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 2 is a plan section on the line 2—2 of the diagram shown in Fig. 1;

Fig. 3 is a diagrammatic, small scale, elevation of a two-tower benzol scrubber unit;

Figure 1:
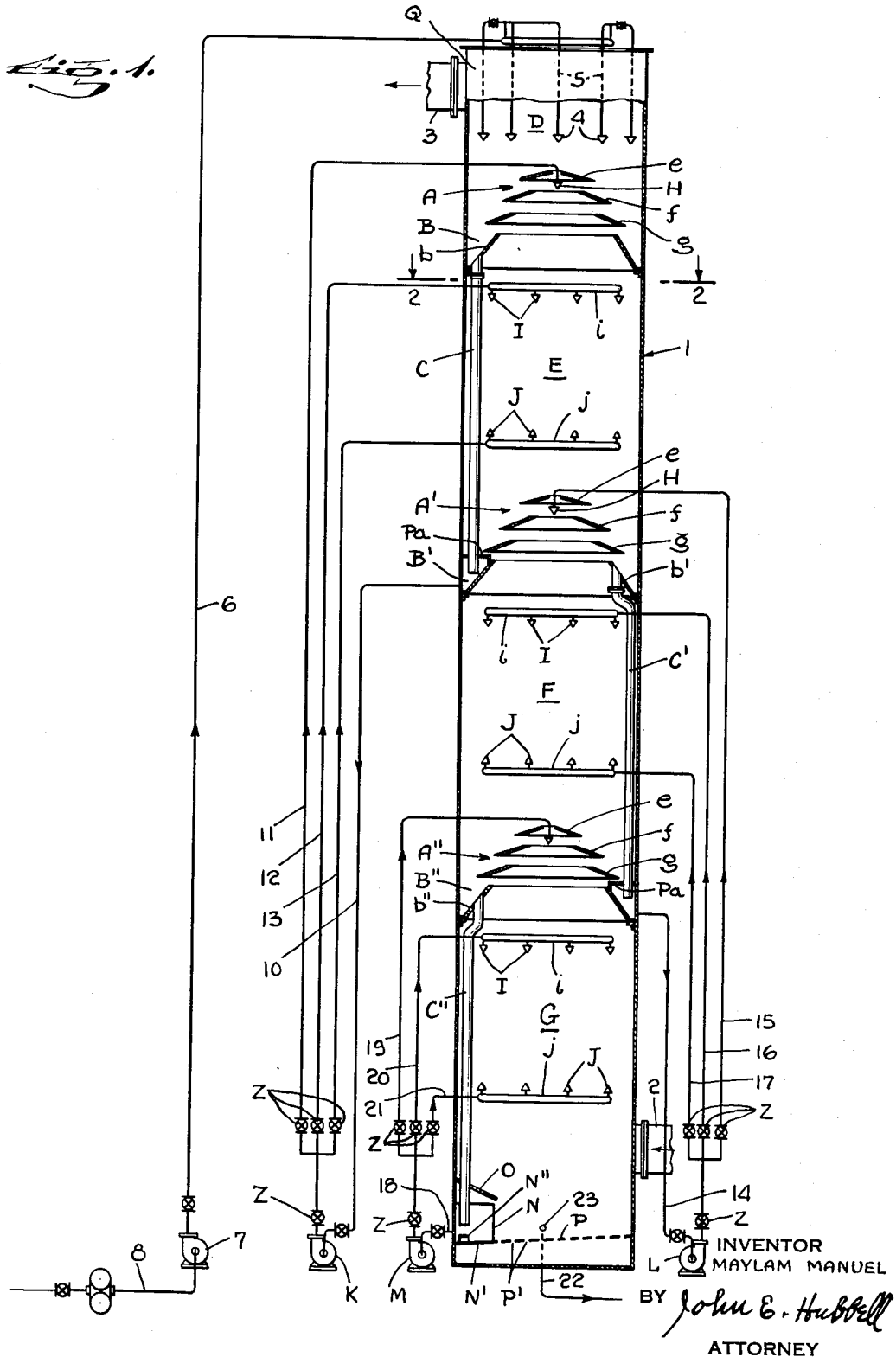
Fig. 1 is a flow diagram of a benzol scrubber.

The embodiment of my invention illustrated by way of example in Figs. 1, 2 and 3, comprises a vertically elongated cylindrical tower or tank 1 provided with a gas inlet 2 at its lower end and a gas outlet 3 adjacent its upper end. Wash oil is sprayed into the tower adjacent its upper end through a plurality of downwardly directed spray nozzles 4 receiving wash oil under suitable pressure through supply piping including a separate pipe 5 for each nozzle extending downwardly to the latter from the tower top and receiving wash oil through suitable branch piping from a supply pipe 6. The latter receives wash oil under pressure from a pump 7 having its inlet conduit 8 connected to any available source of wash oil. In ordinary practice, the wash oil passing to the pump 7 through the pipe 8, comes more or less directly from a light oil plant in which oil, previously used in absorbing benzol in a benzol scrubbing tower, is de-benzolized.

Most of the wash oil discharged by the nozzles 4 passes downwardly into engagement with baffle or deflector elements e, f and g forming parts of a louver A coaxial with the tower 1 and arranged to deflect into an annular collecting trough B, the wash oil impinging against the louver. The trough B has an inner wall b in the form of a hollow truncated cone with its larger lower or base end in engagement with and mechanically connected to the cylindrical wall of the tower 1. An annular portion of the tower wall forms the outer wall of the trough B. Wash oil discharged by the nozzles 4 and not directly engaging the louver A, passes directly into the trough B. The elements e, f and g are in the form of annular sections of relatively flat hollow cones. The inner and outer diameters of the element f are larger than the corresponding diameters of the element e, and are smaller than the corresponding diameters of the element g. Thus the element e overlaps the upper portion of the element f and the latter overlaps the upper portion of the element g, and the lower portion of the element g overlaps the upper portion of the inner wall of the trough B. The elements e, f and g are located at successively higher levels to provide annular gas flow passages constituting a portion of the gas flow path through the tower.

The tower 1 is divided into four superposed scrubbing sections D, E, F and G. The louver A and trough B collectively form a wall pervious to the upflowing gas, but not to the downflowing oil, which separates the uppermost tower section D from the immediately subjacent section E. The lower end wall of the section E is formed by a louver A' and a trough B' which may be respectively identical in form to the louver A and trough B. The liquid collecting in the trough B at the bottom of the section D is passed into the trough B' by a vertical drain pipe C having its upper end open to the trough B and having its lower end extending into the trough B'. Wash oil is sprayed into the section E through an upper spray nozzle H, an intermediate group of nozzles I and a lower group of nozzles J. The nozzle H is shown as located at a level between the level of the lower edge of the baffle element e and above the level of the upper edge of the baffle f of the louver A. Wash oil is sprayed downward through the group of nozzles I which depend from a header i adjacent, but below the lowermost portion of the trough B. Wash oil is sprayed upwardly into the lower portion of the section E by the spray nozzles J which extend upward from a supply header j. The latter is located at a level which is above the top of the louver A', but is nearer to the bottom of the trough B' than to the bottom of the trough B.

The liquor sprayed into the section e through the nozzles H, I and J, is withdrawn from the trough B' through the inlet pipe 10 of a pump K which has its outlet connected to three branch discharge pipes 11, 12 and 13. The pipe 11 supplies wash oil to the single central spray nozzle H between the elements e and f of the upper louver A. The outlet pipe 12 supplies wash oil to the header i and thereby to the downwardly directed nozzles I in the upper portion of the section E. The pipe 13 passes wash oil to the header j and thereby to the upwardly discharging spray nozzles J.

The tower section F directly beneath the section E may be, and as shown, is a counter-part of the section E except in respect to its pipe connections. The wash oil passing into the trough B' through the drain pipe C, and the wash oil sprayed into the section F and deflected into that trough by the louver A', are necessarily greater in amount than the wash oil withdrawn from the trough B by the pump K. The excess liquid collecting in the trough B' passes through a drain, or overflow, pipe C' into the trough B" at the bottom of the section F. The overflow pipe C' differs from the drain pipe C in that it opens to the trough B' adjacent the top of the latter, while the pipe C opens into the lower portion of the trough B. Wash oil collecting in the trough B" at the bottom of the section F is withdrawn from the latter by a pump L having its inlet connected by a pipe 14 to the trough B". The outlet of the pump L is connected to three branch pipes 15, 16 and 17 which supply spray liquid respectively to the nozzles H, I and J in the section F. The wall separating the section F from the bottom section G is formed by a louver A" and trough B", respectively similar to the walls formed by the louver A, trough B, and by the louver A' and trough B'.

Wash oil passing into the trough B" in excess of the amount of wash oil withdrawn by the pump L, passes away from said trough through an overflow pipe C" which is like the overflow pipe C' in that its upper end opens into the upper portion of the trough B", as the upper end of the pipe C' opens into the upper portion of the trough B'. The wash oil overflowing from the trough B" through the overflow pipes C" discharges into a bottom outlet box N which has its lower end wall N' at a relatively short distance above the bottom wall of the tank or tower 1. An opening N" is formed in the bottom wall N' of the box N. Wash oil is sprayed into the section G through nozzles H, I and J which are spaced and arranged with respect to the louver A" and trough B" as the nozzles H, I and J of the sections E and F are disposed with respect to the louvers and troughs respectively above the sections E and F. The wash oil sprayed into the section G through the corresponding nozzles H, I and J, is withdrawn from the box N through the inlet pipe 18 of a pump M. The latter has three branch outlet pipes 19, 20 and 21 connected to the nozzles H, I and J, respectively. The wash oil sprayed into the section G through its nozzles H, I and J, passes into the lower end portion of the section G and thence into the box N through its bottom wall inlet N". A generally horizontal wall P shown as an extension of the bottom wall N' of the box N, is formed with distributed openings which retard the passage of wash oil downward through the wall P into a collecting space P' at the bottom of the tower. As shown, the wall P extends away from the box N with a slight inclination upwardly from the horizontal.

The wash liquid passing downward through the section G is prevented from entering the box N through its open upper end by an inclined baffle O. The retardation of the passage of the wash oil into the space P' and thence into the box N, serves the purpose of substantially and advantageously reducing the amount of gas entrained by the wash oil passing through the pump M and its inlet pipe 18. For the same purpose, the downflow pipes C and C' have their lower ends extending into the troughs B' and B'' through openings in baffles or deflectors Pa. The parts Pa prevent descending spray liquid particles from passing directly into the portions of the troughs B' and B'' from which liquid is drawn by the inlet or suction pipes of the pumps K and L, respectively. The wash oil sprayed into the section G and not withdrawn by the pump N, is withdrawn from the scrubbing tower through a pipe 22 connected to a tower outlet 23.

The tower 1 may be used as a single benzol scrubber unit, but it was devised for use and is being used in combination with a second tower 1a to form the two tower benzol scrubber unit shown diagrammatically in Fig. 3. The tower 1a shown in Fig. 3 may be a replica of the tower 1 shown in Fig. 2. The wash oil outlet 22 of the tower 1 is connected through a screen R to a pump 7a which supplies wash oil to nozzles in the tower 1a like the nozzles 4 shown in Fig. 1. The tower 1a has an outlet 23a at its lower end with a pipe 22a connected thereto for withdrawing the wash oil from the scrubbing unit shown in Fig. 3. The pipe 22a ordinarily passes wash oil to a light oil plant in which all but a small fraction of the benzol absorbed from the wash oil is separated from the latter. The wash oil thus de-benzolized may then be returned to the tower 1 through its supply pipe 8 shown in Fig. 1. In normal operation, the benzol content of the wash oil withdrawn from the oil outlet of the scrubbing unit usually contains from 1.7% to 2.5% of benzol. In the de-benzolizing apparatus the benzol content of the wash oil is reduced to from .3% to .5%, after which the wash oil with its small .5% benzol content is returned to the wash oil inlet of the benzol scrubbing unit. When the tower 1 is used as a benzol scrubber unit to separate all of the recoverable benzol content in coke oven gas, its outlet pipe 22 will normally lead to the light oil plant from which de-benzolized scrubbing oil is returned through the pipe 8 and pump 7 to the nozzles 4 in the top portion of the tower.

In each of the tower units 1 and 1a, a relatively short upper end portion Q of the tower serves as an entrainment arrestor to eliminate or reduce the small amount of wash oil entrained in the gas and carried out of the tower into the gas outlet 3. As those skilled in the art will understand, when the tower 1 is used to recover all of the recoverable benzol in coke oven gas, the rate at which gas is passed into the tower is necessarily substantially smaller than when the tower is connected in tandem with its second tower 1a as shown in Fig. 2.

The headers i and j may, and are assumed to be all alike and of the form shown in Fig. 2, which is a plan view of a header i with a pipe extension suitable for connection to any one of the pump branch outlets 12, 16 and 20. The header i as shown in Fig. 2, comprises a tube bent to form a tubular ring to which the upper end of the corresponding pump outlet branch is connected. As shown, twelve downwardly directed spray nozzles I are connected to and depend from the header i, those nozzles being spaced at equal intervals along the length of the circular header i. A tubular member ia extends between and is open at its ends to diametrically opposed portions of the header i, and is provided with four tubular arms ib. The arms ib are arranged in aligned, end-to-end pairs, transverse to and extending horizontally away from the tube ia at opposite sides of the latter. A downwardly extending spray nozzle I depends from the free end of each of the four arms ib. In addition, a depending nozzle I, coaxial with the tower 1, depends from the central portion of the member ia. The arms ib attached to each member ia, are of such length and so disposed that the nozzles I at the ends of those arms are equally spaced about the tower axis at a distance from the latter approximately equal to half the length of the radius of the circular tube i.

The benzol scrubber unit shown in Figs. 1–3 is adapted for commercial operation. Each of the towers 1 and 1a is 110 feet high and has an inside diameter of 17 feet. The bottom of the lowermost collecting trough B'' in each tower is approximately 30 feet 5 inches above the lower end of the tower. In each tower, the vertical distance between the bottoms of the troughs B'' and B' is 26 feet, and the distance between the bottom of the troughs B and B' is also 26 feet. The distance between the center lines of the headers i and j in each of the sections E, F and G is 13 feet 6 inches. The center line of each of the headers i is 21 inches below the lower edge of the corresponding trough B, B' of B'', adjacent and above the header. The top of the central portion of each louver element e is approximately 8 feet 6 inches above the bottom of the immediately subjacent trough B, B' or B''. The pump 7 normally supplies wash oil to the nozzles 4 at the rate of 1,200 gallons per minute. Each of the pumps K, L and M normally withdraws wash oil at the rate of 2,250 gallons per minute from the corresponding trough B, B' or B'' through a 12 inch pipe. Each of said pumps K, L and M supplies wash oil through its pipe 11, 15 or 19, which is a 4 inch pipe, to the corresponding central nozzle H. Each pump K, L and M passes wash oil to the two associated headers i and j through a separate 8 inch pipe.

The spray nozzles 4, H, I and J of the tower 1 are all atomizing nozzles of the well known commercial "Spraco" type nozzles. The tower 1 includes twenty-six 2 inch nozzles 4 of the "Spraco 11A" type. Each of the center nozzles H is a 4 inch nozzle of the "Spraco 15D" type. There are seventeen 2 inch nozzles of the "Spraco 11A" type associated with each of the headers i and j. Those skilled in the art will understand, however, that other forms of spray nozzles may be used in lieu of those just specified by way of example.

The tower, nozzle and pipe dimensions just stated by way of illustration and example, are well adapted for use under conditions of the character indicated. Said dimensions may be widely varied for various reasons, and particularly for use with substantially different volumetric rates of gas flow through the tower. In practice, the maximum vertical extent of each individual section E, F and G should be small enough to insure proper dispersion of the wash oil, and should be great enough to suitably minimize the number of collecting louvers A, A', etc., and collecting troughs B, B', etc., required. The vertical extent of each individual tower section should also be kept small enough to prevent a relatively large reduction in the average benzol content of the peripheral portion relative to the average benzol content of the central or core portion of each wash oil particle or droplet. Any increase in the number of sections above the minimum required for satisfactory operation, increases the construction, operation and maintenance costs of the scrubber. In particular, it increases the number of pumps and the amount of pumping energy required. The proper dispersion of the wash oil is impossible when the vertical extent of the section is unduly great, primarily because of the tendency of the downwardly moving particles of scrubbing liquid to coalesce and increase in size, with a resultant undesirable decrease in the aggregate surface area of the particles in the section.

The present invention differs specifically from the invention disclosed and claimed in the previously mentioned Otto application, Serial No. 34,515, in respect to the manner in which the wash oil is dispersed in the lower sections of the scrubbing towers. In the operation of the apparatus illustrated in Fig. 1 of the present application, the spray liquid particles discharged upwardly by the nozzles J have a higher initial velocity than do the particles discharged by the downwardly discharging nozzles I. This high initial velocity of the upwardly moving particles diminishes rapidly as a result of gravitational action, but results, nevertheless, in a desirable multiplicity of collisions between upwardly moving particles discharged by the nozzles J and downwardly moving particles discharged by the nozzles I. Moreover, when the vertical displacement of the nozzles is not too great, the average relative velocities of the colliding particles is great enough to shatter many of the particles and thereby create fresh, finely divided paricltes in the intermediate and lower portions of the section. The average benzol content of the peripheral portions of said fresh, finely divided particles or droplets is of the same order as the average benzol content of the core portions of those particles. As a result, the downwardly moving particles in the lower portion of the section provide a desirably high aggregate and efficient surface area for contact with the ascending gas, even though those particles have an average size greater than the average size of the particles initially discharged by either set of nozzles I and J.

While the nozzles I and J are of the same type, form and size and have the same nominal discharge capacity under similar operating conditions of 750 gallons per minute, the relative rates of discharge by the nozzles I and J in each of the sections D, E, F and G of Fig. 1, are subject to regulation by the associated throttling valves Z. Such valves are ordinarily provided in all of the pump lines in accordance with the customary practice of the art. The relative discharges of the nozzles I and J in each of the tower sections E, F and G is also dependent on the relative pressure heads of the wash oil supplied to the headers $i$ and $j$ in the same section. The specific gravity of the wash oil is ordinarily such that a difference in the liquid head of 13 feet 6 inches corresponds to a pressure difference of about 5 pounds per square inch. With wash oil supplied to the nozzles J at a pressure of 5 pounds per square inch in excess of the pressure at which the wash oil is supplied to the nozzles I in the same section, the nozzles J will discharge wash oil at a higher volumetric rate than will the nozzles I in the same section. Furthermore, the oil discharged by the nozzles J will be more finely subdivided than the wash oil discharged by the nozzles I. In some cases it may be advantageous to use nozzles J which differ in type or form from the nozzles I in the same section, so that under the same operating conditions, the average size of the wash oil particles discharged by the nozzles J will be smaller than the particles discharged by the nozzles I, and so that the particles discharged by each nozzle J will spread less than do the particles discharged by each nozzle I under the same operating conditions.

As will be apparent to those skilled in the art, the general principles of the present invention may be utilized in benzol scrubbers of quite different forms and dimensions. Thus, I have illustrated in Figs. 4 and 5, by way of example, a benzol scrubbing tower $1b$, suitable for commercial use, which is only 86 feet high and has an inside diameter of only 8 feet, and comprises only three superposed sections D', E' and G'. The tower $1b$ will ordinarily be associated with a similar tower in the general manner in which the tower 1 is associated with the tower $1a$ in Fig. 3. Some elements shown in Fig. 4 which are similar or analogous to elements shown in Figs. 1 to 3, are designated by similar or analogous reference symbols. As shown, the sections E' and G' of the tower $1b$ are longer than the sections E and G, respectively, of Fig. 1, and each of the sections E' and G' includes a third group of spray nozzles $Ib$. The nozzles $Ib$ are intermediate the upper nozzles $Ia$ and the lower nozzles $Ja$ in the same section.

Figure 4:
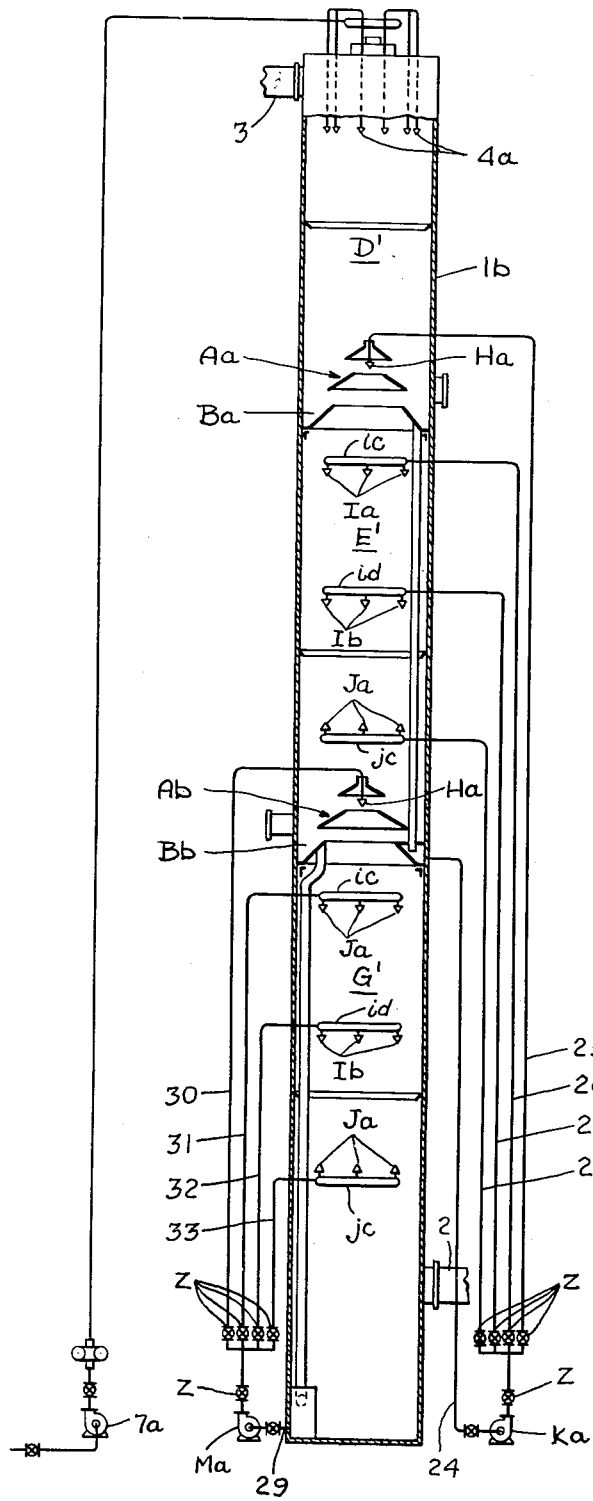
Fig. 4 is a flow diagram of a benzol scrubber differing in form from the scrubber shown in Fig. 1.

In the tower shown in Fig. 4, the top nozzle $Ha$ in each of the sections E' and G' is a commercially available 2 inch nozzle of the type commercially designated "2H60" and having a normal or rated discharge capacity of 105 gallons per minute, when operated with oil supplied under pressure of 20 p. s. i.

The locations of the nozzles $Ia$ and $Ja$ relative to the adjacent troughs $Ba$ and $Bb$ of the section E' are generally similar to the locations of the nozzles I and J relative to the adjacent collecting troughs B and B' of Fig. 1. The nozles $Ia$, $Ib$ and $Ja$ in each of the sections E' and G', are connected to and receive wash oil from headers $ic$, $id$ and $jc$, respectively. In each of the sections E' and G', the header $id$ is 9 feet below the haeder $ic$ and 9 feet above the header $jc$. The troughs $Ba$ and $Bb$ at the upper and lower ends of the section E' are spaced 25 feet apart, and the bottom of the trough $Bb$ is 34 feet above the lower end of the tower $1b$. The previously mentioned center nozzles $Ha$ are located relative to the louvers $Aa$ and $Ab$ at the upper ends of the sections E' and G', as the nozzles H are located relative to the louvers A and A" of Fig. 1.

Figure 5:
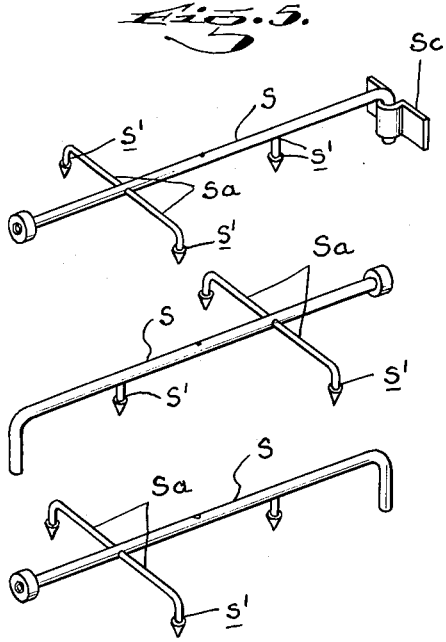
Fig. 5 is a perspective view illustrating the nozzle header arrangement shown in Fig. 4.

The two sets of nozzle headers $ic$, $id$ and $jc$ in the sections $Ea$ and $Ga$ are alike, and one set is shown in Fig. 5. As shown, each of said headers includes a horizontal tubular element S which extends diametrically across the tower $1b$ and directly supports one nozzle respectively above or below a nozzle orifice displaced from the axis of the tower. The element S also supports two aligned horizontal arms $Sa$ extending in opposite directions away from the member S, and at the opposite side of the tower axis from the nozzle orifice $s'$. Each arm $Sa$ supports a nozzle arranged to discharge downwardly or upwardly away from a corresponding nozzle orifice $s'$. Each tubular element S has one end extending through the tower wall and connected to an external elbow $Sb$ adapted to connect said elbow to a corresponding pump discharge pipe. The other end of each member S is shown as engaging a supporting bracket $Sc$ welded or otherwise attached to the inner wall of the tower. As is shown in Fig. 5, the three tubular elements S in the same tower section have their tubular body portions parallel to one another with their axes in the same vertical plane. However, the intermediate element $Sa$ is angularly displaced 180° from the other two elements.

With the three headers $ic$, $id$ and $jc$ proportioned and arranged in each of the sections E' and G' as described, and with the relatively small diameter of the tower $1b$, an excellent distribution and dispersion of the wash liquid is obtainable in each section notwithstanding the very considerable vertical extent of each section. The relatively high velocity of the finely divided liquid sprayed upwardly into the lower portion of each scrubbing chamber by the upwardly directed nozzles $Ja$, subjects the downwardly moving liquid particles discharged by the nozzles $Ia$ as well as those discharged by the nozzles $Ib$ to the globule shattering action of the lower nozzles $Ja$.

A characteristic feature of the invention illustrated in Fig. 5 as in Fig. 1, is the location of the various circulating pumps at or adjacent the ground level so that those pumps are in position to facilitate their inspection, cleaning, adjustment and repair. While the uppermost collecting trough is many feet above the ground level, the location of the corresponding pump at the ground level involves no significant loss of available water head. With the arrangement shown and a normal adjustment of the regulating valves Z, the liquid pressure in the nozzle spraying upward into the lower portion of each scrubbing section substantially exceeds the pressure in the nozzles spraying downward in the upper portion of the same section.

The excess of the supply pressure in the lower nozzles over the supply pressure in the upper nozzles of each section, results, other things being equal, in a subdivision of the liquid sprayed upward in the lower portion of the section which is finer than the subdivision of the liquid sprayed downward in the upper portion of the section. The finer subdivision and the higher initial velocity of the liquid sprayed upward are both desirable. The finer subdivision of the liquid in the lower portion of the scrubbing section is desirable to insure more liquid contact surface in the lower portion of each scrubbing section than would otherwise exist, and also reduces the tendency to liquid entrainment in the gas passing upward out of the section. The fine subdivision of the liquid sprayed upward has a tendency to provide compensation for the tendency of the downwardly moving liquid particles to increase in volume without a corresponding increase in their surface area as a result of coalescence.

As is explained in my prior application, Serial No. 34,515, the pressure of the benzol in the upflowing gas and the benzol in the downflowing wash oil, must be so related in practical operation that the actual benzol washer pressure in the gas is appreciably in excess of the partial benzol pressure in the gas under the equilibrium condition in which there is no net transfer of benzol between the gas and wash oil. The difference between the actual and equilibrium partial benzol pressures in the gas provides the "driving force" or partial pressure head necessary to effect the transfer of benzol from the gas to the oil. The necessity for such a driving force or partial pressure head explains why it is not practically possible in the operation of a scrubbing tower, to remove all of the benzol content of the gas entering the tower. Under any given set of operating conditions, the benzol content of the gas entering the scrubbing tower available for recovery therein, is the portion of the initial benzol content of the gas in excess of the benzol content which must be left in the gas leaving the tower to maintain an adequate driving force differential between the actual and equilibrium partial pressures of the gas at the top of the tower. The rate at which benzol is transferred from the gas to the wash oil depends upon the aggregate interfacial surface of the gas and liquid contact per unit of tower volume, and the aggregate surface depends upon the tower construction and mode of operation. The regulation of the size of the oil particles sprayed into each of the scrubbing chambers below the oil inlet chamber at the top of the tower and the relative velocities of the downwardly and upwardly moving particles when they collide are conducive to efficient operation, and a relatively rapid rate of transfer of benzol from the gas to the wash oil.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In separating benzol vapors from coke oven gas, the method which comprises passing the gas upward through substantially unobstructed superimposed sections of a vertically elongated scrubbing path, spraying an adsorbent oil into the uppermost of said sections and respraying said oil in each of a major number of subsequent sections at a plurality of spray points in a downward direction away from a plurality of horizontally distributed spray points in the upper portion of said section, and spraying another portion of the oil sprayed in said section upwardly away from a plurality of horizontally distributed spray points in the lower portion of said section, and collecting the oil sprayed in each upper section and spraying it into the intermediate subjacent section at said vertically and horizontally distributed spray points.

2. A method as specified in claim 1, in which a third portion of the oil resprayed in at least one of said subjacent sections is sprayed in a downward direction away from a plurality of horizontally distributed spray points at a level intermediate the spray points in the upper portion and the spray points in the lower portion of said section.

3. In separating benzol vapors from coke oven gas, the method which comprises passing the gas upward through substantially unobstructed superimposed sections of a vertically elongated scrubbing path, spraying an adsorbent oil into the uppermost of said sections and respraying said oil in each of a major number of subsequent sections at a plurality of spray points in a downward direction away from a pluraltiy of horizontally distributed spray points in the upper portion of said section, and spraying another portion of the oil sprayed in said section upwardly away from a plurality of horizontally distributed spray points in the lower portion of said section, and collecting the oil sprayed in each upper section and spraying it into the intermediate subjacent section at said vertically and horizontally distributed spray points, and regulating the velocities with which the oil portions are respectively sprayed away from said upper and lower spray points of each subjacent section to cause the upwardly and downwardly sprayed oil particles to collide in a predetermined portion of each subjacent section intermediate its upper and lower spray points.

4. In separating benzol vapors from coke oven gas, the method which comprises passing the gas upwardly through substantially unobstructed superimposed sections of a vertically elongated scrubbing path, spraying an absorbent oil into the uppermost of said sections and respraying said oil in subsequent sections at a plurality of spray points in a downward direction away from a plurality of horizontally distributed spray points in the upper portion of said section, and spraying in at least one of said subjacent sections another portion of the oil sprayed into said sections upwardly away from a plurality of horizontally distributed spray points in the lower portion of said section, and regulating the velocities with which the oil portions are respectively sprayed away from said upper and lower spray points to cause the upwardly and downwardly sprayed oil particles to collide in a predetermined intermediate portion of said section.

5. An apparatus for separating benzol vapors from coke oven gas comprising in combination, a vertically elongated scrubbing tower shell with a gas inlet and a gas outlet at its lower and upper ends respectively, and providing a continuous gas flow path between said inlet and outlet and means for passing an absorbing oil into the portion of said path in each of a plurality of superimposed tower sections comprising means for passing oil into and distributing it in the upper portion of the uppermost of said sections, and a plurality of spray nozzles distributed vertically and horizontally in the upper and lower portions of each of the subjacent sections, the upper spray nozzles discharging downwardly and the lower spray nozzles discharging upwardly, a wash oil collecting device at the upper end of each of said subjacent sections arranged to collect oil sprayed into the section immediately above said subjacent section, and oil pumping means for passing the oil collected in each of said collecting devices under pressure to the different spray nozzles in the subjacent sections.

6. Apparatus as specified in claim 5, in which each of said pumps is located at a level adjacent the lower end of said tower and in which each pump is provided with means for regulating the pressures at which said pump passes oil to said upper and lower nozzles.

7. Apparatus as specified in claim 5, including means through which each pump passes oil to the lower nozzles of the corresponding section at a pressure exceeding the pressure at which the pump supplies oil to the upper nozzles in said section by an amount approximately proportional to the difference in elevation of the upper and lower nozzles.

8. Apparatus as specified in claim 5, including downwardly discharging spray nozzles horizontally distributed in each section at a level intermediate the levels of said upper and lower spray nozzles in the section, and in which each pump is provided with a third outlet through which oil under pressure is supplied to said intermediate nozzle.

9. Apparatus as specified in claim 5, including separate means for variably throttling each pump outlet.

10. Apparatus as specified in claim 5, including a louver at the upper end of each of said scrubbing sections providing an outlet for the upflowing gas and deflecting downwardly moving oil into the collecting means at the upper end of the corresponding section, and including a downwardly discharging spray nozzle in the upper portion of the louver, and means through which the pump associated with the corresponding section passes oil to each of the last mentioned nozzles.

11. Apparatus as specified in claim 5, in which the nozzles horizontally distributed in each of said upper and lower portions of each section are supported by separate branches of a horizontal pipe extending through the wall of the tower.

12. In separating benzol vapors from coke oven gas, the method which comprises passing the gas upward through substantially unobstructed superimposed sections of a vertically elongated scrubbing path, spraying an absorbent oil into the uppermost of said sections and respraying said oil in each of a major number of subsequent sections at a plurality of spray points in a downward direction away from a plurality of horizontally distributed spray points in the upper portion of said section, and spraying another portion of the oil sprayed in said section upwardly away from a plurality of horizontally distributed spray points in the lower portion of said section, and collecting the oil sprayed in each upper section and spraying it into the intermediate subjacent section at said vertically and horizontally distributed spray points and minimizing the size of the liquid particles moving downward through the lower portion of the section by spraying finely divided liquid upward into said lower portion of the section.

References Cited in the file of this patent

UNITED STATES PATENTS

| 1,791,751 | Chester | Feb. 10, 1931 |
| 2,484,918 | Wentworth | Oct. 18, 1949 |
| 2,554,428 | Swearingen | May 22, 1951 |
| 2,675,215 | Otto | Apr. 13, 1954 |

FOREIGN PATENTS

| 87,018 | Switzerland | Feb. 16, 1921 |
| 120,304 | Great Britain | Nov. 7, 1918 |
| 551,359 | Germany | May 30, 1932 |
| 624,071 | France | July 7, 1927 |